United States Patent [19]

Derosa et al.

[11] Patent Number: 5,019,287

[45] Date of Patent: May 28, 1991

[54] ENHANCED WEAR RESISTANT ADDITIVE AND LUBRICATION OIL COMPOSITION CONTAINING SAME

[75] Inventors: Thomas F. Derosa, Passaic, N.J.; Benjamin J. Kaufman, Hopewell Junction; Rosemary J. Jennejahn, Nelsonville, both of N.Y.

[73] Assignee: Texaco Inc., White Plains, N.Y.

[21] Appl. No.: 444,221

[22] Filed: Dec. 1, 1989

[51] Int. Cl.$^5$ ............................................. C10M 147/00
[52] U.S. Cl. .................................. 252/54.6; 525/275; 525/276; 525/293
[58] Field of Search ................. 252/54, 54.6; 525/293, 525/275, 276

[56] References Cited

U.S. PATENT DOCUMENTS 4,764,304 8/1988 Kapuscinski ..................... 252/515 R
4,863,623 9/1989 Walesnik ........................ 252/51.5 A Primary Examiner—Jacqueline V. Howard
Attorney, Agent, or Firm—Robert A. Kulason; James J. O'Loughlin; Vincent A. Mallare

[57] ABSTRACT

An additive composition containing pendant perfluoroaliphatic urethanes within a copolymer prepared from ethylene and propylene or an ethylene-propylene terpolymer containing non-conjugated diene or triene comprising from about 15 to 80 mole percent of ethylene, 85 to 15 mole percent propylene and from about 20 to 85 mole percent of the ($C_3$–$C_{10}$) alphamonoolefin and having a number average molecular weight ranging from about 5,000 to 500,000 which has been reacted with at least one isocyanoacrylate agent to form one or more acrylating reaction intermediates characterized by having a pendant isocyano function within their structure and reacting said reaction intermediate with a perfluoroaliphatic alcohol and a lubricating oil composition containing same are provided.

15 Claims, No Drawings

ENHANCED WEAR RESISTANT ADDITIVE AND LUBRICATION OIL COMPOSITION CONTAINING SAME

BACKGROUND OF THE INVENTION

This invention relates to a lubricant additive which is a Viscosity Index Improver (VII) which imparts enhanced wear resistance when employed in a lubricating oil composition.

The addition of oligomeric waxes or oils of polytetrafluoroethylene (PTFE) to lubricating oils is designed to reduce wear and friction on mechanized components of internal combustion engines. Less frequent replacement of worn or damaged engine components, greater gasoline efficiency, and greater intervals between engine oil changes are direct consequences. PTFE oils or waxes are not, however, soluble in any known lubricating oils.

Thus, an objective of this invention is to provide a derivatized graft copolymer composition that is soluble in oil.

Another object of the invention is to provide a oil-soluble perfluoroaliphatic lubricant additive that is effective as a viscosity index improver and as a material that enhances wear resistance to the lubricating oil composition.

A further object is to provide a lubricating oil composition containing the graft copolymer additive of the invention as well as to provide concentrates of the additive of invention.

DISCLOSURE STATEMENT

U.S. Pat. No. 3,933,656 discloses a method of friction reduction between metal surfaces using a dispersion of polytetrafluoroethylene in lubricating oil.

U.S. Pat. No. 4,224,173 discloses a method of using polytetrafluoroethylene dispersions in lubricating oils to reduce friction in internal combustion engines.

U.S. Pat. No. 4,284,518 discloses a method of using a colloidal dispersion of polytetrafluoroethylene as a wear resistant additive to reduce wear in surfaces during physical operation.

These disclosures, namely, U.S. Pat. Nos. 3,933,656, 4,224,173, and 4,284,518 are incorporated herein by reference.

SUMMARY OF THE INVENTION

The reaction product of the present invention comprises a chemical modification of an ethylene-propylene copolymer or terpolymer. Terpolymers are typically ($C_3$-$C_{10}$) alpha-monoolefin as well as a nonconjugated dienes or trienes. Lubricating oil compositions will be characterized by having viscosity index improver and wear resistance properties.

The invention comprises a chemical modification of an ethylene copolymer or terpolymer by chemically incorporating 2-isocyanoethylacrylate (I):

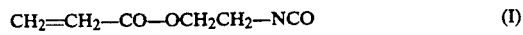

$$CH_2=CH_2-CO-OCH_2CH_2-NCO \qquad (I)$$

onto the polymeric substrate and then further derivatizing using a perfluoroaliphatic alcohol.

Perfluoroaliphatic alcohols (II) that can be used in the derivation process are those materials that contain the perfluoroaliphatic unit and are represented by the following formula:

$$CF_2-(CF_2)_a-(CH_2)_b-OH \qquad (II)$$

in which the difluoro repeat unit, i.e., a, has a range of 1 to 20 while the hydrocarbon repeat unit, i.e., b, has a range of 2 to 10.

DETAILED DESCRIPTION OF THE INVENTION

The present method of reducing wear and friction of mechanical components in internal combustion engines is by chemically incorporating oligomeric perfluor oaliphatic grafts onto ethylene-propylene copolymers or terpolymers.

This method offers distinct advantages over other methods that utilize perfluorooligomers in lubricating oils. Firstly, ethylene-propylene copolymers and terpolymers containing chemically grafted perfluorooligomers are completely soluble in a wide variety of solvents, including lubricating oils. This permits wear resistant properties to be imparted to the lubricating oils in a wide variety of temperatures and under engine operating conditions. Secondly, the grafting methodology has application to polymers other then those with ethylene-propylene backbones.

The copolymer or terpolymer substrate employed as a novel additive may be prepared from ethylene and propylene or it may be prepared from ethylene and propylene and a higher olefin typically comprising ($C_3$-$C_{10}$) alpha-olefins.

More complex polymer substrates, often designated as interpolymers, may be prepared using a third component. The third component generally used to prepare an interpolymer substrate is a polyene monomer selected from non-conjugated dienes and trienes. This non-conjugated diene component typically has from 5 to 14 carbon atoms in the chain. The diene monomer can include acyclic, cyclic and bicyclic compounds. Representative dienes include 1,4-hexadiene, 1,4-cyclohexadiene, dicyclopentadiene, 5-ethylidene-2-norbornene,5-methylene-2-norbornene, 1,5-heptadiene, and 1,6 octadiene. A mixture of more than one diene can be used in the preparation of the interpolymer. A preferred non-conjugated diene for preparing a terpolymer or interpolymer substrate is 1,4-hexadiene.

The triene component will have at least two nonconjugated double bonds, and up to about 30 carbon atoms in the chain. Typical trienes useful in preparing the interpolymer of the invention are 1-isopropylidene-3a,4,7,7a-tetrahydroindene, 1-isopropylidenedicyclopentadiene, dehydroisodicyclopentadiene, and 2-(2-methylene-4-methyl-3-pentenyl)-[2,2,1]bicyclo-5-heptene.

The polymerization reaction to form the polymer substrate is generally carried out in the presence of a catalyst in a solvent medium. The polymerization solvent may be any suitable inert organic solvent that is liquid under reactions conditions for solution polymerization of monoolefins which is generally conducted in the presence of a Ziegler-Natta type catalyst. Examples of satisfactory hydrocarbon solvents include straight chain paraffins having from 5-8 carbon atoms, with hexane being preferred. Aromatic hydrocarbon, preferably aromatic hydrocarbon having a single aromatic nucleus, such as benzene, toluene and the like; and saturated cyclic hydrocarbons having boiling point ranges approximating those of the straight chain paraffinic hydrocarbons and aromatic hydrocarbons described above, are particularly suitable. The solvent selected may be a mixture of one or more of the foregoing hydrocarbons. It is desirable that the solvent be free of substances that will interfere with the Ziegler-Natta polymerization process.

In a typical preparation of the polymer substrate, hexane is first introduced into a reactor and the temperature in the reactor is raised moderately to about 30° C. Dry propylene is fed to the reactor until the pressure reaches about 40–45 inches of mercury. The pressure is then increased to about 60 inches of mercury and dry ethylene and 5-ethylidene-2-norbornene are fed to the reactor. The monomer feeds are stopped and a mixture of aluminum sesquichloride and vanadium oxytrichloride are added to initiate the polymerization reaction. Completion of the polymerization reaction is evidenced by a drop in the pressure in the reactor.

Ethylene-propylene or ethylene-propylene higher alpha monoolefin terpolymers may consist of from about 15 to 80 mole percent ethylene and from about 20 to 85 mole percent propylene or higher monoolefin with the preferred mole ratios being from about 20 to 75 mole percent ethylene and from about 25 to 75 mole percent of a ($C_3$–$C_{10}$) alpha monoolefin with the most preferred proportions being from 55 to 80 mole percent ethylene and 20 to 45 mole percent propylene, and having a number average molecules weight ranging from about 25,000 to about 250,000.

Terpolymer variations of the foregoing polymers may contain from about 0.1 to 10 mole percent of a non-conjugated diene or triene.

The polymer substrate, that is the ethylene-propylene copolymer or terpolymer is an oil-soluble, substantially linear, rubbery material having a number average molecular weight from about 5,000 to 500,000 with a preferred number average molecular weight range of 25,000 to 250,000 and a most preferred range from about 50,000 to 150,000.

The terms polymer and copolymer are used generically to encompass ethylene -propylene copolymers, terpolymers or interpolymers. These materials may contain minor amounts of other olefinic monomers so long as their basic characteristics are not materially changed.

The 2-isocyanoethylacrylate may be grafted onto the polymer backbone in a number of ways. It may be grafted onto the backbone by a thermal process known as the "ene" process or by grafting in solution using a free radical initiator. The free-radical induced grafting of substituted acryamides in non-polar solvents containing 5-9 carbon atoms or monoaromatic solvents, benzene being the preferred method. It is carried out in an inert atmosphere at an elevated temperature in the range of about 100° C. to 250° C., preferably 120° C. to 190° C., and more preferably at 150° C. to 180° C., e.g. above 160° C., in a hydrocarbon solvent, preferably a mineral lubricating oil solution, containing, e.g. 1 to 50 wt percent polymer, preferably 20 to 40 wt %.

The free radical initiators which may be used to chemically graft 2-cyanoethylacrylate to the polymer backbone are peroxides, hydroperoxides, and azo compounds and preferably those which have a boiling point greater than 100° C. and decompose thermally within the grafting temperature range to provide free radicals. Representative of these free radical initiators are dicumyl peroxide and 2,5-dimethyl-hex-3-yne-2,5-bis-tertiary-butyl peroxide. The initiator is used in an amount of between 0.005% and about 2% by weight based on the weight of the reaction mixture solution. The grafting is preferably carried out in an inert atmosphere, preferably nitrogen. The resulting polymer is characterized by having 2-isocyanoethylacrylate functions within its structure.

The intermediate polymer possessing a pendant 2-isocyanoethylacrylate function is reacted with perfluoroaliphatic alcohols represented by the following formula:

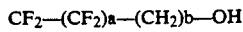

$$CF_2\text{—}(CF_2)_a\text{—}(CH_2)_b\text{—}OH$$

in which the perfluoro repeat unit, i.e., a, varies from 1 to 20 while the hydrocarbon repeat unit, i.e., b, varies from 2 to 10.

The perfluoroaliphatic alcohol may be a perfluoroalkyl-1,1,2,2-tetra-H-ethyl alcohol having a molecular weight range of about 440 to about 525, and preferably an average molecular weight of about 475.

Examples of perfluoroaliphatic alcohols are those materials where the average perfluoroalkyl chain length is 7.3, or 8.2, or 9.0 while the hydrocarbon repeat unit may vary from 2 to 10, 2 being the preferred number. Perfluoroaliphatic alcohols with average perfluoroalkyl chain lengths of 7.3, 8.2, and 9.0 consist of mixtures of perfluoroalkyl chains, the weight percentages of which are described in Table I. They are available commercially under the tradenames of ZONYL BA-L, ZONYL BA, and ZONYL BA-N, respectively, and are manufactured and sold by the E. I. DuPont deNemours and Co of Wilmington, Del.

TABLE I

| Fluoroalkane Chain | Weight Percentages Of Perfluoroalkyl Chains Present In Perfluoroaliphatic Alcohols | | |
|---|---|---|---|
| | ZONYL BA-L (wt %) | ZONYL BA (wt %) | ZONYLBA-N (wt %) |
| $C_4F_9$ | 4 max | 4 max | 0 |
| $C_6F_{13}$ | 50 3 | 35 3 | 6 max |
| $C_8F_{17}$ | 29 2 | 30 3 | 50 3 |
| $C_{10}F_{21}$ | 11 2 | 17 2 | 29 2 |
| $C_{12}F_{25}$ | 4 1 | 8 1 | 11 2 |
| $C_{14}F_{29}$ and higher | 2 max | 6 max | 4 max |

The reaction between the polymer substrate containing pendant 2-isocyanoethylacrylate and the prescribed perfluoroaliphatic alcohol is conducted by heating a solution of the polymer intermediate under inert conditions and then adding the perfluoroaliphatic alcohol with stirring to effect the reaction. It is convenient to employ an oil solution of the polymer substrate heated to 140° to 175° C. while maintaining the solution under a nitrogen blanket. One or more of the perfluoroaliphatic alcohols with an average perfluoroalkyl repeat unit of 7.3, 8.2, or 9.0 is added to this solution and the reaction is effected under these conditions.

The following examples illustrate the preparaton of the reaction product additive of this invention.

EXAMPLE I

Preparation of OCP-g-2-isocyanoethylacrylate

Two hundred grams of polymeric substrate consisting of about 60 mole percent ethylene and 40 mole percent propylene and having a number average molecular weight of 80,000 was dissolved in 1440 grams of solvent neutral oil at 160° C. using a mechanical stirrer while the mixture was maintained under a blanket of nitrogen. After the rubber was dissolved, the mixture was heated an additional hour at 160° C. Eleven grams of 2-isocyanoethylacrylate grams of dissolved in 10 grams of solvent neutral oil was added to the above mixture along with 2.5 grams of dicumyl peroxide also dissolved in 10 grams of oil. The mixture reacted for 2.5 hours at 160° C. then filtered through a 200 mesh screen.

EXAMPLE II

Reaction of OCP-g-2-isocyanoethylacrylate with perfluoroaliphatic alcohol

Twenty six grams of the aforementioned graft copolymer was dissolved in 174 grams of solvent neutral oil at 160° C. using mechanical stirring under a nitrogen blanket. Perfluoroaliphatic alcohol (3.4 grams) with a perfluoroaliphatic repeat unit of 9.0 was added neat to the mixture and the reaction heated for an additional hour under the aforementioned conditions. The mixture was then cooled to 120° C. and filtered through 200 mesh filter.

EXAMPLE III

Reaction of OCP-g-2-isocyanoethylacrylate with perfluoroaliphatic alcohol 2.8 g of perfluoroaliphatic alcohol with a perfluoroaliphatic repeat unit of 8.2 may be substituted in the aforementioned procedure.

EXAMPLE IV

Reaction of OCP-g-2-isocyanoethylacrylate with perfluoroaliphatic alcohol 2.2 g of perfluoroaliphatic alcohol with a perfluoroaliphatic repeat unit of 7.3 may be substituted in the aforementioned procedure.

The graft and derivatized polymer of the invention is useful as an additive for lubricating oils that is designed to enhance wear resistance of mechanized components in internal combustion engines. It can be employed in a variety of oils of lubricating viscosity including natural and synthetic lubricating oils and mixtures thereof.

The additives can be employed in crankcase lubricating oils for spark-ignited and compression-ignited internal combustion engines. The compositions can also be used in gas engines, or turbines, automatic transmission fluids, gear lubricants, metal-working lubricants, hydraulic fluids, and other lubricating oil and grease compositions. Their use in motor fuel compositions is also contemplated.

The base oil may be a natural oil including liquid petroleum oils and solvent-treated or acid-treated mineral lubricating oils of the paraffinic, naphthenic and mixed paraffinic-naphthenic types.

In general, the lubricating oil composition of the invention will contain the reaction product in a concentration ranging from about 0.1 to 30 weight percent. A preferred concentration range for the additive is from about 1 to 15 weight percent based on the total weight of the oil composition.

Oil concentrates of the additive may contain from about 1 to 50 weight percent of the additive reaction product in a carrier or diluent oil of lubricating oil viscosity.

The reaction product of the reaction may be employed in lubricating oil compositions together with conventional lubricant additives. Such additives may include additional dispersants, detergents, anti-oxidants, pour point depressants and the like.

The novel reaction product of the invention is tested for its effectiveness as an anti-wear additive in formulated lubricating compositions. The base lubricating oil used in anti-wear testing is a typical lubricating oil with representative valves as illustrated below in Table II.

TABLE II

| Component | Parts By Wgt. |
|---|---|
| Solvent Neutral Oil A | 83.50 |
| Solvent Neutral Oil B | 5.00 |
| Product | 11.50 |

Oil A has a Sp. Gr. at 60/60° F. of 0.858–0.868; Vis. @ 100° F. is 123–133 cPs; Pour Point is 0° F. Oil B has a Sp.Gr. at 60/60° F. of 0.871–0.88 F.; Vis. @ 100° F. is 325–350 cPs; Pour Point is 10° F.

Anti-wear properties of the novel additive were evaluated using the Four Ball Wear Test, MS 82–79. In this test the oil is heated to 167° C. for 60 minutes at 600 RPM's under a 10 kg load. Anti-wear properties are assessed on the basis of scar diameters of standardized components. Reference oil samples containing unmodified ethylene-propylene copolymers or ethylene-propylene terpolymers are first evaluated so that a comparison with the chemically modified polymers can be done.

To assess wear resistance of ethylene-propylene copolymers containing urethane-grafted perfluoroaliphatic moieties, the material was subjected to the Four Ball Wear Test. An 11.5 weight percent of the modified ethylene-propylene copolymer dissolved in lubricating oil was subjected to a 40 kilogram weight at 600 rpms at 167° F. for 60 minutes. Testing was designed to underscore the fact that pendant perfluoroaliphatics alone do not impart enhance wear resistance to additives, but only in conjunction when grafted to the ethylene-propylene copolymer with a urethane bond. Polymeric materials tested were also those containing pendant perfluoroaliphatic groups derived from perfluoroaliphatic methylmethacrylate and perfluoroaliphatic ethylene. In all cases the monomer contained the identical weight distribution of perfluoro-oligomers. All graft copolymers containing perfluoroaliphatic appendages were soluble in oil. The results of Four Ball Wear Test are provided below in Table III.

TABLE III

| Material | Average Scar Diameter (mm) |
|---|---|
| Unmodified ethylene-propylene copolymer | 0.53 |
| Perfluoroaliphatic urethane graft | 0.46 |
| Perfluoroaliphatic methylmethacrylate graft | 0.63 |
| Perfluoroaliphatic ethylene graft | 0.60 |

The results from the Four Ball Wear Test show that enhanced wear resistance is obtained by a unique combination of perfluoroaliphatic groups grafted to ethylene-propylene copolymers using a urethane bond.

We claim:

1. A lubricating oil comprising a major amount of an oil of lubricating viscosity and a minor viscosity improving amount of a additive prepared by the steps comprising:

(a) reacting a polymer prepared from ethylene and at least one ($C_3$–$C_{10}$) alpha-monoolefin comprising from about 15 to 80 mole percent of ethylene and from about 20 to 85 mole percent of said ($C_3$–$C_{10}$) alpha-monoolefin and having a number average molecular weight ranging from about 5,000 to 500,000;

(b) reacting said polymer with 2-isocyanoethyl-acrylate which has a reactive pendant isocyano group within its structure;
(c) reacting said reaction polymer in step (b) with a perfluoroaliphatic alcohol group consisting of a unique weight average distribution of perfluoroaliphatic groups represented by the following formula:

$$CF_3(CF_2)_a-(CH_2)_b-OH$$

wherein a ranges from 1 to 20 and b ranges from 2 to 10; and (d) recovering the product additive composition.

2. A lubricating oil composition according to claim 1 wherein "a" is 7.3.

3. A lubricating oil composition according to claim 1 wherein "a" is 8.2.

4. A lubricating oil composition according to claim 1 wherein "a" is 9.0.

5. A lubricating oil composition according to claim 1 in which said polymer has a number average molecular weight from about 50,000 to 500,000.

6. A lubricating oil composition according to claim 1 in which said polymer has a number average molecular weight from about 50,000 to 150,000.

7. A lubricating oil composition according to claim 1 in which said polymer comprises from about 20 to 75 mole percent ethylene and from about 25 to 75 mole percent of a $C_3-C_6$ alpha-monoolefin.

8. A lubricating oil composition according to claim 1 in which said polymer comprises from about 25 to 55 mole percent ethylene and from about 20 to 45 mole percent of propylene.

9. A lubricating oil composition according to claim 1 wherein there is present from about 0.1 to about 10 weight percent of said additive based on the total weight of the oil composition.

10. A lubricating oil composition according to claim 1 wherein there is present from about 1 to about 7.5 weight percent of said additive based on the total weight of the oil composition.

11. A lubricating oil composition according to claim 1 in which said polymer comprises from about 25 to 75 mole percent of said ethylene and from about 25 to 75 mole percent of a said ($C_2-C_{10}$) alpha-monoolefin and has a number average molecular weight ranging from about 25,000 to 250,000.

12. An additive composition according to claim 1 in which said perfluoroaliphatic alcohol is perfluoroalkyl-1,1,2,2-tetra-H-ethyl alcohol with an average molecular weight of 443.

13. An additive composition according to claim 1 in which said perfluoroaliphatic alcohol isperfluoralky-1,1,2,2-tetra-H-ethyl alcohol with an average molecular weight of 475.

14. An additive composition according to claim 1 in which said perfluoroaliphatic alcohol is perfluoroalkyl-1,1,2,2-tetra-H-ethyl alcohol with an average molecular weight of 514.

15. A concentrate for a lubricating oil comprising a diluent oil of lubricant viscosity and from about 1 to about 50 weight percent of the additive composition of claim 1 based on the total weight of the concentrate.

* * * * *